(12) United States Patent
Jagannathan

(10) Patent No.: US 7,720,815 B1
(45) Date of Patent: May 18, 2010

(54) CIRCULAR REPLICATION OF DATA

(75) Inventor: Ramesh Jagannathan, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 303 days.

(21) Appl. No.: 11/845,379

(22) Filed: Aug. 27, 2007

(51) Int. Cl.
*G06F 17/30* (2006.01)
(52) U.S. Cl. ........................... 707/640
(58) Field of Classification Search ............ 707/2, 707/201, 204, 640; 709/226
See application file for complete search history.

(56) References Cited

U.S. PATENT DOCUMENTS 4,733,391 A * 3/1988 Godbold et al. ............ 370/254
2005/0148891 A1 * 7/2005 Yamashita ................ 600/509
2007/0100910 A1 * 5/2007 Gole et al. ................ 707/204
2008/0098113 A1 * 4/2008 Hansen et al. ........... 709/226

OTHER PUBLICATIONS

Maxia, G., "Advanced MySQL Replication Techniques," http://www.onlamp.com, Apr. 20, 2006, 14 pages.

* cited by examiner

*Primary Examiner*—Etienne P LeRoux
(74) *Attorney, Agent, or Firm*—Thomas, Kayden, Horstemeyer & Risley, LLP

(57) ABSTRACT

Various systems, methods, and programs embodied in computer-readable mediums are provided for implementing circular replication among nodes. In a representative example, a plurality of nodes are arranged in a circular replication configuration. Each of the nodes has a logfile indicating storage of a plurality of entries, where each of the nodes receives the entries from a plurality of external devices. The entries received by a respective one of the nodes are replicated in the remaining ones of the nodes via circular replication.

43 Claims, 7 Drawing Sheets

| NodeCfile | |
|---|---|
| Log File Position | Log File Data |
| 4223 | Record of Data |
| 4224 | Record of Data |
| 4225 | Record of Data |
| 4226 | Record of HBT |
| 4227 | Record of Data |
| 4228 | Record of Data |
| 4229 | Record of HBT |
| 4230 | Record of Data |

Node C Heatbeat File 126 — 136

| Entry | Node | Master | Slave I/O | Slave SQL | Node Log Filename | Node Log Position | Master Log Filename | Master Log Position |
|---|---|---|---|---|---|---|---|---|
| 1 | A | D | Yes | Yes | NodeAfile | 102 | NodeDfile | 5417 |
| 2 | B | A | Yes | Yes | NodeBfile | 2951 | NodeAfile | 418 |
| 3 | C | B | Yes | Yes | NodeCfile | 2001 | NodeBfile | 3267 |
| 4 | D | C | Yes | Yes | NodeDfile | 6366 | NodeCfile | 2318 |
| 5 | A | D | Yes | Yes | NodeAfile | 1368 | NodeDfile | 102 |
| 6 | B | A | Yes | Yes | NodeBfile | 4217 | NodeAfile | 1684 |
| 7 | C | B | Yes | Yes | NodeCfile | 3268 | NodeBfile | 4534 |
| 8 | D | C | Yes | Yes | NodeDfile | 1052 | NodeCfile | 3585 |
| 9 | C | B | No | Yes | NodeCfile | 3902 | NodeBfile | 5168 |
| 10 | C | B | No | Yes | NodeCfile | 4218 | NodeBfile | 5168 |
| 11 | C | B | No | Yes | NodeCfile | 4595 | NodeBfile | 5168 |

Selected Entries from Node C Heatbeat File 126

| 3 | C | B | Yes | Yes | NodeCfile | 2001 | NodeBfile | 3267 |
| 6 | B | A | Yes | Yes | NodeBfile | 4217 | NodeAfile | 1684 |
| 9 | C | B | No | Yes | NodeCfile | 3902 | NodeBfile | 5168 |

CIRCULAR REPLICATION OF DATA

BACKGROUND

Redundant systems are often used to maintain important data. Such systems usually involve a primary device that receives data to be stored and one or more secondary devices that are used to maintain mirror copies of the data. However, one problem with such systems is that the primary device is the only device that receives the data from external devices which can limit the capabilities of the system.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is drawing of one example of a logfile maintained in each of the nodes of FIG. 1 according to an embodiment of the present invention;

FIG. 3 is a drawing of one example of a heartbeat table maintained in each of the nodes of FIG. 1 according to an embodiment of the present invention;

FIG. 4 is a drawing of selected entries from the heartbeat table of FIG. 3 according to an embodiment of the present invention;

DETAILED DESCRIPTION

Figure 1:
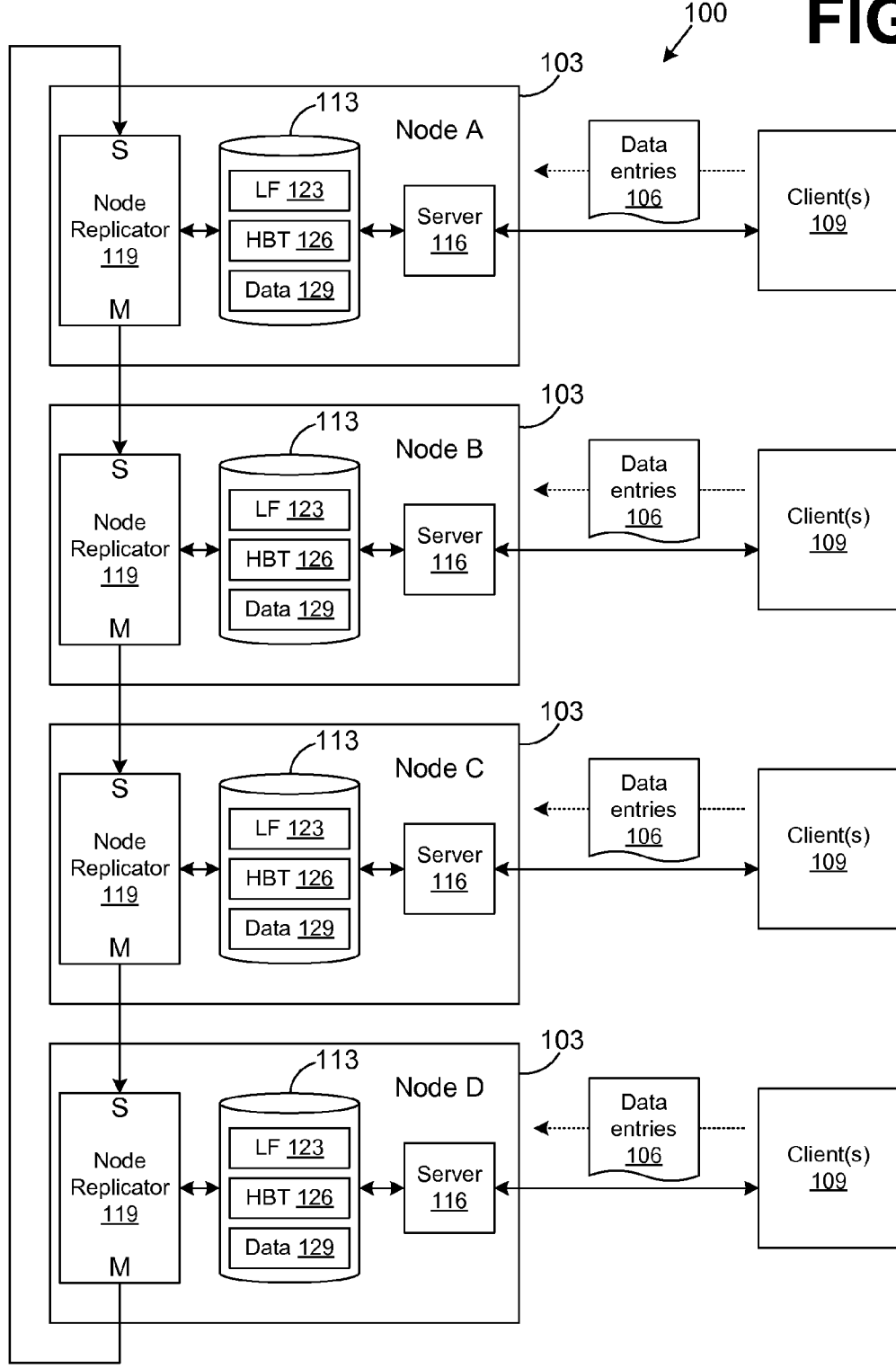
FIG. 1 is a drawing of a plurality of nodes arranged in a circular replication configuration according to an embodiment of the present invention.

With reference to FIG. 1, shown is a circular replication configuration 100 comprising a plurality of nodes 103 according to an embodiment of the present invention. As shown in FIG. 1, there are four nodes 103 labeled Nodes A, B, C, and D. Although four nodes 103 labeled as such are illustrated herein, it is understood that two or more nodes 103 may be employed in the circular replication configuration 100, where the four nodes 103 are shown to provide one example by which the various embodiments of the present invention may be described. The nodes 103 are in data communication with each other over an appropriate network. Such a network may comprise, for example, the Internet, intranets, wide area networks (WANs), local area networks (LANs), wireless networks, or other suitable networks, etc., or any combination of two or more such networks.

Each of the nodes 103 is configured to receive data entries 106 from respective clients 109. Also, data entries are received in each of the nodes 103 from an adjacent node that is master with respect to a given node 103 in a circular replication configuration as will be described. Each of the nodes 103 may act as a server to the clients 109 or may be in some other relationship with the clients 109. In interacting with the respective nodes 103, the clients 109 may generate the data entries 106 that are ultimately uploaded and saved in the respective nodes 103 as will be described. The data entries 106 may comprise, for example, a knowledge base about various subjects such as, for example, data that is used for support functions in an installation or for any other purpose. In this respect, the data entries 106 are added to the data stored in the nodes 103 over time reflecting experience with various issues in running an installation such as a server farm or other installation so that troubleshooters may learn from the experience of those who encountered various issues on a previous occasion.

Within each node 103 is a data store 113, a server application 116, and a node replicator 119. Stored within the data store 113 are a logfile 123, a heartbeat file 126, and a data table 129. The data entries 106 are stored in the data tables 129. For each data entry 106 that is stored in the data tables 129 of a respective node 103, a corresponding entry is recorded in the respective logfile 123. Thus, the logfile 123 is used to keep track of the data entries 106 stored in the node 103.

The circular replication configuration 100 is employed for a redundant storage of the data entries 106 in the data tables 129 of each of the nodes 103. To this end, the circular replication configuration 100 acts to ensure that the data entries 106 stored in a data table 129 of a node 103 as indicated by the respective logfile 123 are the same in each one of the nodes 103 for redundant data storage. By storing the same data in multiple nodes 103, the data is maintained even though one or more of the nodes 103 may experience a failure from time to time.

In order to ensure that each entry 106 that is received by a respective one of the nodes 103 from a client 109 is replicated in the remaining nodes 103 of the circular replication configuration, each of the nodes 103 is designated as a master M of an adjacent downstream one of the nodes 103 in the circular replication configuration 100. Each of the nodes 103 is also designated a slave S to an adjacent, upstream one of the nodes 103. To implement the circular replication, the entries 106 from each master M are replicated to the slave S of the master M. In one embodiment, each master M may push data entries 106 to its respective slave S. Alternatively, each slave S may access and read data entries 106 from their respective masters M.

An identifier is associated with each data entry 106 that indicates the node 103 that first received the entry 106 from a client 109. For purposes of circular replication, the node 103 that first receives a data entry 106 from a client 109 is an originating node 103 with respect to that data entry 106. The identifier for each data entry 106 thus identifies the originating node 103 with respect to such data entry 106. An entry 106 received from a master M that originated in a given node 103 will not be duplicated in such node 103. In such a case, the entry 106 has circulated around all of the nodes 103 and the identifier associated with the entry 106 indicating the originating node 103 will keep the entry 106 from being stored in the originating node 103 more than once.

The node replicator 119 is included in each of the nodes 103 in order to implement the circular replication of the entries 106 among the nodes 103. In its capacity as a master M, each node replicator 119 is configured to facilitate the periodic sending of downstream updates of entries 106 to a respective node 103 acting as a slave S to the master M. The "downstream" direction of data refers to the direction of the flow of data through the respective nodes 103 in this manner. Thus, the "flow" of data in the circular replication configuration 100 refers to the flow of data from the respective masters M to the slaves S during the replication process. As such, the data is transmitted from the masters M to the slaves S periodically in groups of entries 106 as will be described. A group of entries 106 is referred to herein as an "update" of entries 106. It follows that the upstream direction is counter to the direction or flow of the data in the circular replication configuration 100.

In its capacity as a slave S, the node replicator 119 is also configured to receive upstream updates of entries 106 from the node 103 that is master M to the given slave S. Each of the node replicators 119 incorporates the upstream updates of entries 106 from their respective masters M into their respective data stores 113. Also, for each entry 106 stored, whether from an update or received from a client 109, a corresponding record is created in the respective logfile 123.

Upon receiving an update of entries 106 from a master M, for each entry in the update, each node 103 determines whether the entry 106 originated at the node 103, where each entry 106 replicated around the nodes 103 is marked with an identifier that identifies the originating node 103 for the entry 106. If an entry originated at the given node 103, indicating that it was replicated to the other nodes 103 coming around full circle back to the originating node 103, then it is not duplicated in the originating node 103 as it already exists in such node 103. Alternatively, the node 103 may be configured to determine whether the entry 106 already exists in the node 103 in some other manner. If an entry 106 received in an update of entries 106 from a master M is already stored in the data store 113, then it is discarded accordingly.

Thus, each of the nodes 103 in the circular replication configuration 100 continuously receives data entries 106 from clients 109 and stores the same in their data stores 113 while noting the storage of the entry 106 with a corresponding entry in their logfile 123. Also, periodically, the node replicators 119 of the respective nodes 103 communicate (via a push or pull approach) all of the new entries stored over the given period of time to the respective adjacent node 103, where the sending node 103 is master M to the receiving node 103 that is slave S to the master M. Corresponding records are created in the logfile 123 of the node 103 acting as the slave S for each of the records obtained from the master M.

According to other embodiments, each of the nodes 103 is configured to periodically generate a heartbeat message that is stored in the respective heartbeat tables 126 of the nodes 103. In addition, each of the heartbeat messages generated by respective nodes 103 is replicated to the remaining ones of the nodes 103 via the circular replication of the circular replication configuration 100. When a given node 103 receives a heartbeat message from another node in the circular replication configuration 100, it stores the heartbeat message in its respective heartbeat table 126. For each heartbeat message stored in a respective heartbeat table 126, a corresponding entry is created in the logfile 123. Thus, each of the heartbeat tables 126 of the respective nodes 103 includes heartbeat messages that are generated locally by the node 103 itself and heartbeat messages that are generated by the remaining ones of the nodes 103 in the circular replication configuration 100.

The heartbeat messages stored in the heartbeat tables 126 provide an indication that the given node 103 is operational. Specifically, the fact that the heartbeat message is generated at all indicates that the node 103 is operational. To this end, the heartbeat messages are generated periodically at predefined time intervals such as every minute or any other appropriate interval. The actual time interval between generation of heartbeat messages in a given node 103 may vary depending upon the specific application for which the circular replication is used.

In addition, each of the heartbeat messages further includes an entry number associated with the logfile 123 of the node 103 that originated the heartbeat message. This entry number indicates a position of a record in the logfile 123 that corresponds to the latest update of entries 106 from the respective master M that was written to the respective node 103. The record may correspond, for example, to the last record in the update of entries 106, or other record as may be deemed appropriate.

Also, each of the heartbeat messages further includes an entry number associated with a position of a record associated with the same update of entries 106 in the logfile 123 of the master M to the node 103 that originated the heartbeat message. Thus, each heartbeat message includes data that correlates the positions of a representative record in the logfiles 123 of a master M and slave S associated with the latest update of entries 106 relayed from the master M to the slave S.

In addition, each of the heartbeat messages also includes a field or other information that indicates a status of a communication link between the respective node 103 that originated the heartbeat message and the node 103 that is master M to the node 103 that originated the heartbeat message.

Each of the nodes 103 is advantageously configured to identify whether the master M to the node 103 has failed, such that the node 103 no longer receives updates of entries 106 from the master M. For example, as depicted in FIG. 1, node B is master to node C. If node B were to fail, then node C would cease to receive updates of entries 106 from node B. As such, node C would cease to receive updates from all of the nodes 103 that are downstream to node C, given the circular replication among the nodes 103.

Node C is configured to determine whether its master node 103 (Node B) has failed. Upon a failure of its respective master node 103, a given node 103 may proceed to establish an alternate one of the nodes 103 as a new master M. In establishing the alternate one of the nodes 103 as a new master, the original master M to the respective nodes 103 is bypassed.

Given that each of the nodes 103 is configured to bypass a failed one of the nodes 103 in the circular replication configuration 100, then the circular replication continues in spite of the failure that is experienced. Given that each of the nodes 103 includes the heartbeat table 126 having heartbeat messages that were generated in all of the nodes 103, a given node 103 may determine whether the master M to the given node 103 has failed by examining the heartbeat messages in its respective heartbeat table 126.

Specifically, when a master M of a given node 103 has failed, then the only heartbeat messages that appear in the heartbeat table 126 thereafter will be generated by the respective node 103 itself, since no heartbeat messages will be received from the failed master M. These messages will indicate that the communication link between the node 103 and the master M to the given node 103 is malfunctioning in several ways. By examining various fields in the heartbeat messages, or by detecting that no heartbeat messages are being received from the master M, a given node 103 can determine whether the communication link with its master M is functioning. As such, a given node 103 can determine whether the master node M to the given node 103 has failed, potentially requiring such failed node 103 to be bypassed. Alternatively, the node 103 may simply track the communication link with the master M independently of the heartbeat messages.

After a failed node 103 is bypassed, the heartbeat tables 126 in all of the nodes 103 are erased to prevent reliance on old heartbeat message data from the bypassed one of the nodes 103. Also, each node 103 then for a short period of time after the heartbeat tables 126 are purged, each of the nodes 103 produces heartbeat messages at an increased rate in order to "prime" the heartbeat tables 126 in the respective nodes 103. This is because if a failure of a node is experienced just after the heartbeat tables 126 are purged, then no information exists to allow such a node to be bypassed. Consequently, the heartbeat messages are generated at a much higher frequency for a short period of time after purging to minimize the possibility of that a failed node could not be bypassed. It follows that by generating and sending heartbeat messages at an increased rate, the amount of data written from a given master M to a slave S is decreased between heartbeat messages.

When a failure of a given node 103 is experienced, in some circumstances bypassing such a node 103 may not be necessary where the failure of a node 103 is recoverable and it can be expected to be back in operation within a reasonable period of time. However, some failures on the part of the nodes 103 may be irrecoverable. An irrecoverable failure as such is one in which a node 103 is down for such a time that the redundant storage provided by the circular replication may be compromised.

As such, each of the nodes 103 is configured to establish a relationship with a new master M upon the failure of an existing master M when the failure is deemed irrecoverable. A failure may be deemed irrecoverable if the failure lasts more than a predetermined period of time. Alternatively, other criteria may be employed to determine whether the failure of a given node 103 is irrecoverable. For example, the nodes 103 may consult a list of types of failures that may occur that will be automatically deemed irrecoverable.

Assuming that a failure of a given node 103 is irrecoverable, then the slave S to such node 103 will endeavor to establish an alternative one of the nodes 103 as a new master M so that the circular replication may continue. In order to establish an alternate one of the nodes 103 as a new master M, each of the nodes 103 is configured to identify a starting point in the entries 106 of the logfile 123 of the potential new master M from which to initiate replication to the node 103 that is slave S to the failed master M. In one embodiment, the alternate one of the nodes 103 that is selected is typically the master M to the failed node 103. This is done since the master M to the failed node 103 will include all of the updates of the entries 106 from each of the nodes 103 in the circular replication configuration 100 including the slave S of the failed node 103.

In one embodiment, each of the nodes 103 is configured to determine the starting point in the records of the logfile 123 of the new master M from the heartbeat messages stored in the node 103. The information associated with each of the heartbeat messages provided allows a given slave S to identify a starting point within a new master M at which to begin replication. This ensures that all data entries 106 that were not received by a slave S of a failed master M are received and that the integrity of the replication of all of the data is maintained.

With reference to FIG. 2, shown is one example of a logfile 123 that is stored in the data store 113 of each of the nodes 103 according to an embodiment of the present invention. The logfile 123 includes records 131 of data entries 106 stored in the data file 129 that comprise data received from the clients 109 (FIG. 1) and records 132 of the heartbeat messages stored in the heartbeat table 126. The records 131 and 132 corresponding to the data entries 106 and heartbeat messages are written to the logfile 123 in the order that the data entries 106 and heartbeat messages were received. Each record 131/132 of a data entry 106 is numbered with an entry number 133 that indicates a position in the logfile 123 for each of the entries 106.

Referring next to FIG. 3, shown is one example of a heartbeat table 126 that may exist, for example, in node C (FIG. 1). The heartbeat table 126 includes a list of heartbeat messages 136. Each heartbeat message 136 includes several components. In the first column, the heartbeat messages 136 are numbered to indicate their position in the heartbeat table 126. In the second column, the node 103 (FIG. 1) that generated the heartbeat message 136 is identified. In the third column, the master of the node 103 that generated the heartbeat message 136 is listed.

The next column is labeled "slave I/O" in which it is indicated whether the slave input/output interface with the respective master node is operating. For example, in record 9, node C is the slave to the master node B. The input/output of node C with reference to node B is labeled "NO" as node C is incapable of communicating with the master B due to the fact that the master B has experienced a failure.

The column labeled "Slave SQL" refers to a function in a given node 103 by which data that is received from a master M is actually applied to the data table 129. The acronym "SQL" stands for "Structured Query Language." The fields associated with the Slave SQL column indicate whether the update of data was actually applied to the respective data table 129. A "Yes" in this field indicates that the data up to the respective node log position in the heartbeat message was applied to the respective data table 129. A "No" in this field indicates that the opposite is the case. Note that a "No" in this field of a heartbeat message may indicate that a given node 103 is malfunctioning, which may require such node 103 to be bypassed.

Associated with each of the heartbeat messages 136 are a name of the logfile 123 of the node 103 that generated the heartbeat message 136, and the name of the logfile 123 of the master to the node 103 that generated the heartbeat message 136. Each heartbeat message 136 includes the entry numbers 133 that indicate a position in the respective logfiles 123 associated with a latest group of entries 106 (FIG. 1) that was replicated from the respective master to the node of origin 103 of the heartbeat message 136.

Stated another way, in a given heartbeat message 136, the entry number 133 associated with a given node 103 that generated the heartbeat message 136 will correlate to the entry number 133 associated with the master of the node 103 for the given latest group of entries that is replicated from the master to the node 103 itself. The correlation of entries between given masters and slaves as provided by the content of the heartbeat messages 136 allows for the determination as to where in a new master M one should start to replicate entries for a slave after a master M fails as will be described.

Referring next to FIG. 4, shown are three specific heartbeat messages 136 taken from the table of FIG. 3 to further describe an approach for establishing a node 103 as a new master M to a slave S of a failed master as described above.

This will be described with reference to a specific scenario where nodes A, B, C, and D are included in a circular replication configuration 100 (FIG. 1) and a failure occurs in node B. It is presumed that this failure is irrecoverable and that node C will wish to establish node A, the master M to failed node B, as its new master M. Given that node C wishes to establish node A as its new master M, it is necessary then to determine where in the logfile 123 of node A to begin to replicate the entries 106 to node C to ensure that node C receives all of the past entries 106 accumulated in node A that did not reach node C due to the failure of node B.

In order to do this, the replicator 119 (FIG. 1) of node C examines its heartbeat table 126 to identify the earliest record in the heartbeat table 126 that indicates a failure of its master M (node B). As seen in the table, the earliest heartbeat message 136 that indicates that node B is malfunctioning is record 9. This is seen because the slave input/output entry for record 9 is the first one that states "NO," indicating that node C is unable to communicate with node B. Thus, it can be assumed that at the time this heartbeat message 136 was generated, node B is no longer operational.

As a consequence, item number 9 is selected for further examination as set forth in the table of FIG. 4. Next, the replicator 119 of node C is configured to identify the latest entry in the heartbeat table 126 that originates from the failed master M (node B). We see that the latest record that originates from node B in the heartbeat table 126 is record 6.

Accordingly, record 6 is also included in the heartbeat messages 136 selected from the heartbeat table 126 as depicted in FIG. 4. Finally, the last record from the current node in the heartbeat table 126 is identified that has a master log position 133 that is less than the node log position 133 of the failed master M. As we can see from record 6, the log position of the failed master node B is "4217." Thus, the last entry from the current node (node C) having a master log position 133 that is less than the node log position 133 of the failed master M would be item number 3 in the heartbeat table 126. Specifically, in item 3, the master log position 133 for node B is noted as "3267" which is less than "4217." Thus, in identifying a starting position from which to replicate from the new master (node A), entries 3, 6, and 9 are selected from the heartbeat table 126 as depicted in FIG. 3.

The information provided by the entries in the table of FIG. 4 relate to node A (the master of the failed master node B and new master to node C), node B (the failed master of node C), and node C (the node with the failed master). The aim is to obtain the position in node A from where node C can continue to replicate in order to bypass node B. In order to know this, it is important to determine how far node B has already replicated from node A, and how much of that data was further replicated from node B to node C.

Since node B is inoperative, one cannot get such information from node B and it therefore has to be determined from the heartbeat messages 136 stored in node C. In particular, the three heartbeat messages 136 set forth in FIG. 4 selected as described above allow node C to determine the starting position in the logfile 123 of node A from which node C has to replicate to continue the circular replication without loss of data. One thing that can be noted from item 6 is that any entries up to entry number "1684" of node A have been conclusively replicated into node C.

This is because entry "1684" of node A corresponds to entry "4217" of node B. The last heartbeat message 136 from node C (record 9) indicates that node C has been updated with all entries from node B up to item number "5168." Since this is greater than item number "4217," it follows that item number "3902" of node C includes all entries from node A up to item number 1684 and several thereafter.

To conclusively determine the position at which replication is to start in node A, the entries after entry number 1684 in node A should be screened against a window of updates that occurred in node C to find the first entry in node A that is not available in the window of node C. The window of updates of node C to be examined should start earlier than item 1684 of node A to guarantee that we find the earliest entry in node A that does not exist in Node C.

It should be noted, however, that item 1684 of node A correlates to item 4217 of node B as set forth in item number 6 of the heartbeat messages 136. To ensure that the window of items of node C begins before item 1684 of node A, we look to entry 3 in which entry number 3267 of node B is less than entry 4217 of node B in item 6 of FIG. 4. Entry number 3267 of node B correlates to entry number 2001 of node C as indicated by record 3.

It follows that entry number 2001 of node C falls before entry 1684 of node A. Thus, entry 2001 is designated as the lower end of the window of node C to be screened against all of the updates of node A after entry 1684. Also, since we know that entry 5168 of node B as depicted in item 9 of FIG. 4 falls after entry number 4217 of node B as shown in row 6, it follows that the entry number 3902 of node C can be used as the upper limit of the window to compare against entries of node A in order to identify the first entry of node A that has not been replicated in node C. Once the window of entries has been identified to examine in node C (records 2001 through 3902), then the entries are taken from node A beginning at item 1684 and compared with the items in the window of node C from entries 2001 through entry 3902. A comparison is performed for every entry from node A to identify a corresponding entry in the window of node C.

The first entry of node A that does not find a corresponding entry in node C indicates the position of node A at which replication should start in order to properly bypass node B without the loss of data. Thus, the above scenario provides a means by which the starting point in node A may be determined from which replication to node C should begin in order to properly bypass node B upon a failure of node B.

Figure 5:
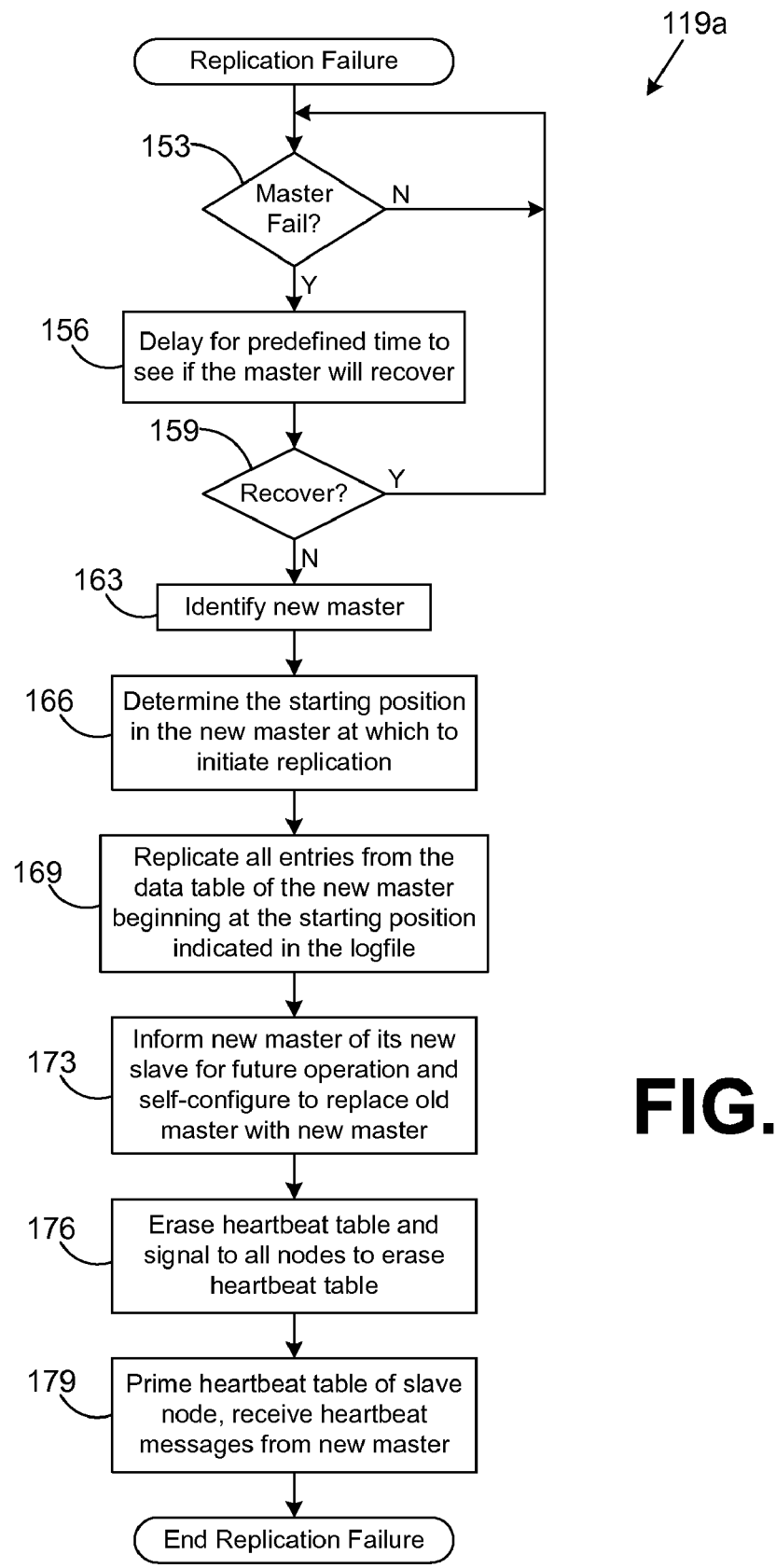
FIG. 5 is a flow chart that provides one example of functionality associated with each of the nodes of FIG. 1 that is implemented upon a failure of a master in the circular replication configuration according to an embodiment of the present invention.

Next, with reference to FIG. 5, shown is a flowchart that illustrates one example of a portion of the functionality of the node replicators 119, denoted herein as node replicator 119a, that is implemented to ensure that the circular replication continues in the circular replication configuration 100 without a loss of data as described above. Alternatively, the flow chart of FIG. 5 may be viewed as depicting steps of an example of a method implemented in each of the nodes 103 in the event of the failure of a node 103 as described above. The functionality of the node replicator 119 as depicted in various flow charts and as otherwise described herein may be implemented, for example, in an object oriented design or in some other programming architecture. Assuming the functionality is implemented in an object oriented design, then each block represents functionality that may be implemented in one or more methods that are encapsulated in one or more objects. The same may be implemented using any one of a number of programming languages such as, for example, C, C++, JAVA, or other programming languages.

Beginning with box 153, the node replicator 119a determines whether the master M (FIG. 1) to the present node 103 (FIG. 1) has failed. Such may be determined, for example, by examining the heartbeat messages 136 (FIG. 3) generated by the current node to determine whether the slave I/O interface with the master M is operational, or that the respective node 103 is applying updates to its data table 129 as indicated by the Slave SQL field. Also, the heartbeat table 126 can be examined to identify whether heartbeat messages have stopped being received from the master M. This may be determined by the fact that, after the failure of the master M, the only messages that will appear in the heartbeat table will be generated by the respective node 103 itself. Also, the failure of the master M may be determined by the fact that consecutive messages in the heartbeat table 126 will include an identical master log position.

Still further, the failure of a node 103 may be determined by examining multiple fields in the heartbeat table 126. For example, if the "Slave SQL" field for a given node 103 is set to "No" and the node log position remains the same through multiple heartbeat messages from the node 103 in a given heartbeat table 126, then the respective node 103 has experienced a failure that prevents data from being replicated downstream given the fact that data that is not applied to a given data table 129 in a node 103 is not transmitted downstream to a slave S. In addition to the foregoing, there may be other ways that a failure of a given node 103 may be determined from the data in a given heartbeat table 126.

Alternatively, the current node 103 may examine the slave I/O interface itself or may query the master M rather than examining the heartbeat message 136 to determine whether the I/O interface with the master M is operational. If the master M is determined to have failed, then the node replicator 119*a* proceeds to box 156. Otherwise, the node replicator 119*a* remains at box 153.

In box 156, the node replicator 119*a* imposes a delay for a predefined period of time to determine whether the failed master M will recover. This reflects the fact that if the failure of the master M is short lived or recoverable, then there may be no need to bypass it to maintain the integrity of the redundancy provided by the circular replication. As such, the master M should recover before the delay is over.

However, if the failure of the master M is irrecoverable and the master M will not be available for some time such that bypassing the failed master node is necessary, then the delay of box 156 will pass without recovery of the master M. Thereafter, in box 159, the node replicator 119*a* determines whether the master M has recovered. If so, then the node replicator 119*a* reverts back to box 153 as no further action need be taken.

However, if the master M to the current node has not recovered from the failure, then the node replicator 119*a* proceeds to box 163 in which the node replicator 119*a* identifies a new master M in order to bypass the failed master M. The new master M may be identified dynamically from the heartbeat messages in the heartbeat table 126 (FIG. 3). For example, the heartbeat messages in a given heartbeat table 126 identify relationships between nodes 103. For example, the heartbeat messages identify the master M of each respective node 103. In one embodiment, the master M of a failed node 103 is always selected as a new master M to the slave S of the failed master M. Thus, the information in the heartbeat messages can be used to identify the master of the failed master M. Alternatively, the identity of the new master M may be preprogrammed into the current node 103. When a new master M is identified, the current node 103 may be configured to confirm that the new master M is operational by sending a query or other message to the new master M in order to receive a reply therefrom, etc.

Thereafter, in box 166, the node replicator 119*a* determines the starting position in the new master M at which to begin replication to the current node. This is done as described above. Then, in box 169, all entries from the logfile 123 (FIG. 1) of the new master M (such as node A in the example above) are replicated to the current node beginning at the starting position identified in box 166. Thereafter, in box 173, the new master M (i.e., node A above) is informed of its new slave S (i.e., node C above) for future operation, and the current node self-configures to replace the old master (i.e., node B above) with the new master M (i.e., node A above).

Next, in box 176, the heartbeat table 126 is erased in the current node. Also, a signal is indicated to all of the other nodes 103 that they should erase their heartbeat tables 126 as inaccurate information may be included from the failed node 103 that should not be relied upon moving forward. Then, in box 179, the heartbeat table 126 of the slave is "primed" by sending out heartbeat messages from the respective node 103 to the slave S at a higher rate. This is done so that a minimum number of heartbeat messages can be placed in the heartbeat table 126 of the slave such that information exists that allows a future failed node 103 to be bypassed. To this end, when each of the nodes 103 erases its heartbeat table 126 in response to a message generated in box 176, each of the nodes 103 proceeds to "prime" their respective heartbeat tables 126 by generating and sending heartbeat messages at a much higher rate of frequency for a short period of time to build up the needed information in each of the heartbeat tables 126 as soon as possible to facilitate bypassing a failed node 103 in the future.

It should be noted that references to the specific nodes of FIG. 1 are provided for clarity of the description and convenience. It is understood that other nodes may be employed as well in other configurations, and that more or less nodes may be employed than those described with reference to FIG. 1.

Figure 6:
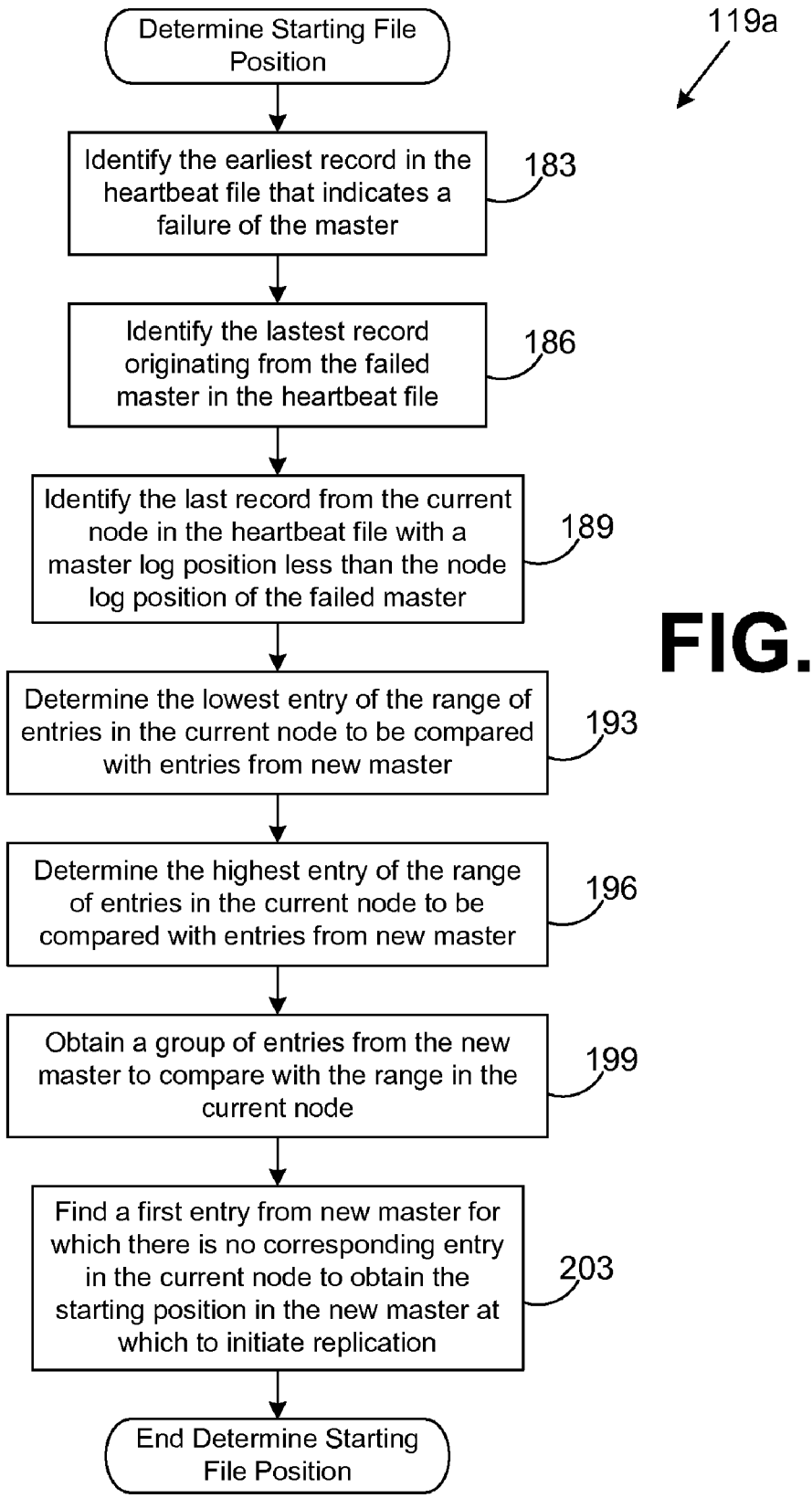
FIG. 6 is a flow chart that provides one example of functionality associated with each of the nodes of FIG. 1 that is implemented to identify a starting file position in a new master at which to begin replication to a slave according to an embodiment of the present invention.

With reference to FIG. 6, shown is a flowchart that provides one example of the operation of the node replicator 119*a* in implementing the function of box 166 (FIG. 5) in determining the starting position in the new master M at which to replicate records. In this respect, in box 183, the node replicator 119*a* identifies the earliest record in the heartbeat table 126 that indicates a failure of the master node. Then, in box 186, the node replicator 119*a* identifies the latest record in the heartbeat table 126 that originates from the failed master M. Thereafter, in box 189, the node replicator 119*a* identifies the last record generated by the current node in the heartbeat table 126 that includes a master log position that is less than the node log position of the failed master node 103.

Then, in box 193 the node replicator 119*a* determines the lowest entry of the range of entries for the current node that are to be compared with entries from the new master M in order to identify a new starting position in the new master M for replication. Then, in box 196, the node replicator 119*a* determines the highest entry of the range of entries associated with the current node to be compared with entries from the new master M to identify the starting position in the new master M at which replication is to be initiated. Then, in box 203, the first entry from the new master M, for which there is no corresponding entry in the current node, is determined in order to identify the starting position in the new master M at which to initiate replication. This is done by comparing the entries from the new master M with those in the window of entries identified in the current node to see if they already exist in the current node. Thereafter, the routine implemented to determine the starting file position ends as shown.

Figure 7:
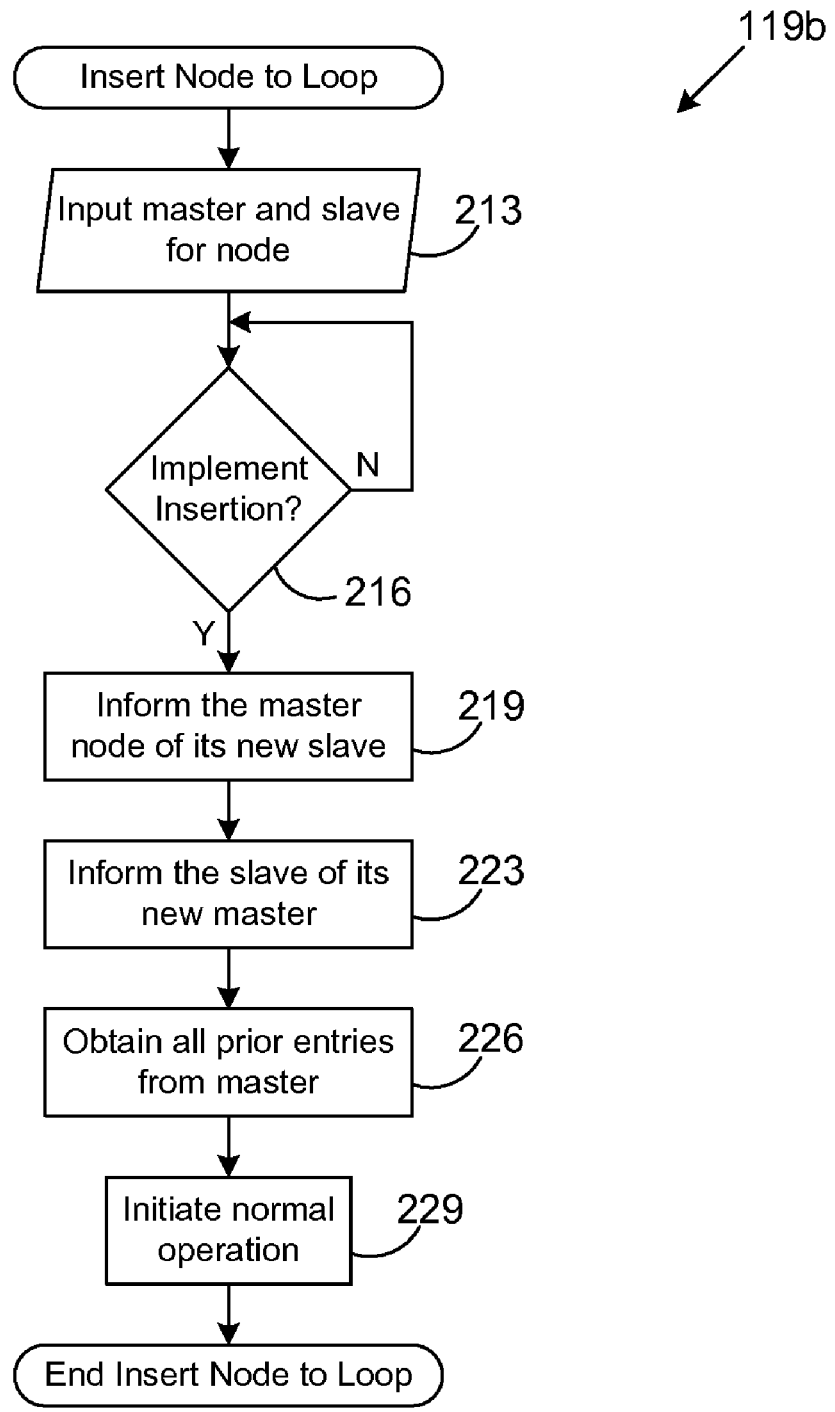
FIG. 7 is a flow chart that provides one example of functionality associated with each of the nodes of FIG. 1 that is implemented in order to insert a new node into the circular replication configuration according to an embodiment of the present invention.

Next, with reference to FIG. 7, shown is a flowchart that illustrates one example of an additional portion of the functionality of the node replicators 119, denoted herein as node replicator 119*b*, that is implemented to insert a node 103 (FIG. 1) into the circular replication configuration 100 (FIG. 1). Alternatively, the flow chart of FIG. 6 may be viewed as depicting steps of an example of a method implemented in each of the nodes 103 insert a node 103 into the circular replication configuration 100.

Beginning at box 213, the node replicator 119b in the node 103 to be inserted receives an input of a master M (FIG. 1) and a slave S (FIG. 1) for the node 103. Thereafter, in box 216 the node replicator 119b waits until the node 103 is inserted into the loop. Assuming the node 103 was inserted, then in box 219 the node replicator 119b informs the master M of its new slave S. In box 223, the node replicator 119b informs the new slave S of its new master M.

Next, in box 226 all prior entries are obtained from the master M to the newly inserted node 103 so that the newly inserted node 103 includes a copy of all entries. Then, in box 229 the node replicator 119b of the newly inserted node 103 initiates normal operation to facilitate the circular replication among the nodes 103. Then, the node replicator 119b ends as shown.

Figure 8:
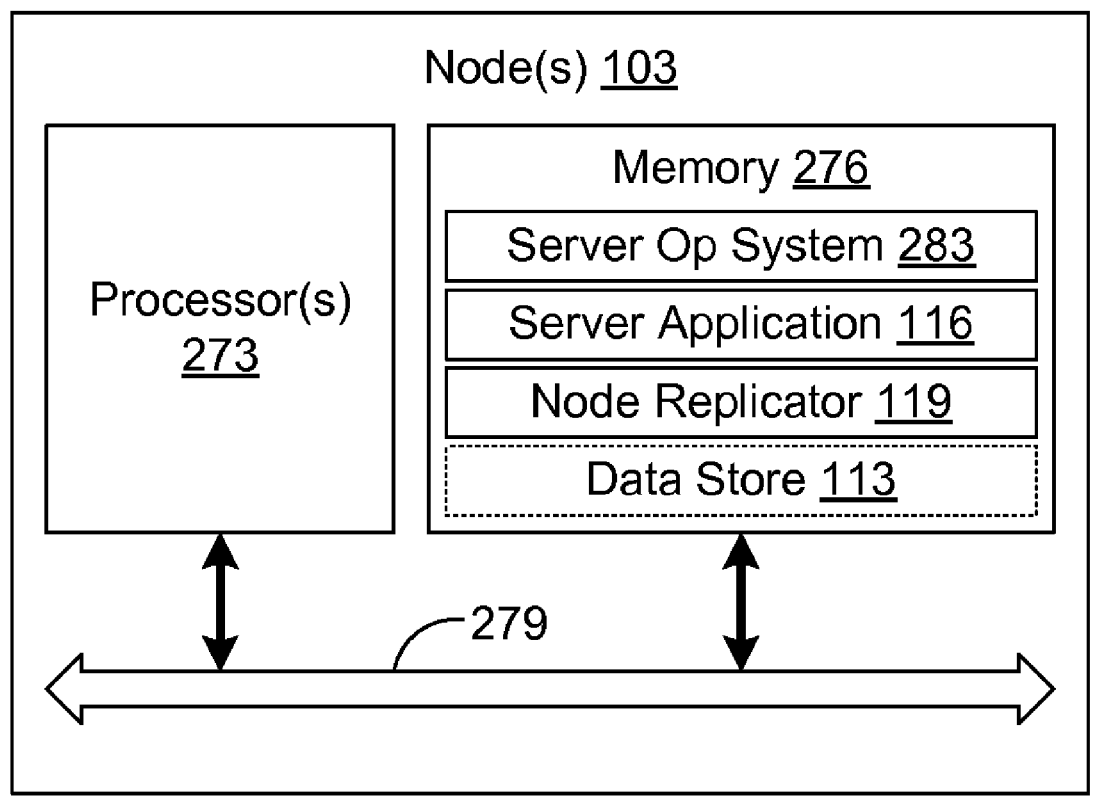
FIG. 8 is a schematic block diagram of one embodiment of a node employed in the circular replication configuration of FIG. 1 according to an embodiment of the present invention.

With reference to FIG. 8, shown is one example of a node 103 that comprises a server or equivalent device according to an embodiment of the present invention. The node 103 may include one or more processor circuits having a processor 273 and a memory 276, both of which are coupled to a local interface 279. In this respect, the local interface may comprise, for example, a data bus with an accompanying control/address bus as can be appreciated. Where the node 103 comprises a server, such a server may comprise a server computer as can be appreciated.

Stored on the memory 276 and executable by the processor 273 are various components such as a server operating system 283, a server application 116 such as, for example, a web server, and the node replicator 119. Also, the data store 113 may be located in the memory 276 as can be appreciated. In addition, it is understood that many other components may be stored in the memory 276 and executable by the processors 273. Also, such components may reside in a memory that is external from the node 103 as can be appreciated.

As set forth above, a number of components are stored in the memory 276 and are executable by the processor 273. In this respect, the term "executable" refers to a program file that is in a form that can ultimately be run by the processor 273. Examples of executable programs may be, for example, a compiled program that can be translated into machine code in a format that can be loaded into a random access portion of the memory 276 and run by the processor 273, or source code that may be expressed in proper format such as object code that is capable of being loaded into a random access portion of the memory 276 and executed by the processor 273. An executable program may be stored in any portion or component of the memory 276 including, for example, random access memory, read-only memory, a hard drive, compact disk (CD), floppy disk, or other memory components.

The memory 276 is defined herein as both volatile and nonvolatile memory and data storage components. Volatile components are those that do not retain data values upon loss of power. Nonvolatile components are those that retain data upon a loss of power. Thus, the memory 276 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 273 may represent multiple processors and the memory 276 may represent multiple memories that operate in parallel. In such a case, the local interface 279 may be an appropriate network that facilitates communication between any two of the multiple processors, between any processor and any one of the memories, or between any two of the memories, etc. The processor 273 may be of electrical, optical, or of some other construction as can be appreciated by those with ordinary skill in the art.

The server operating system 283 is executed to control the allocation and usage of hardware resources such as the memory and processing time in the node 103. In this manner, the server operating system 283 serves as the foundation on which applications depend as is generally known by those with ordinary skill in the art.

Although the functionality of the various nodes 103 as described above with respect to FIGS. 1-7 is described as being embodied in software or code executed by general purpose hardware as discussed above, as an alternative the same may also be embodied in dedicated hardware or a combination of software/general purpose hardware and dedicated hardware. If embodied in dedicated hardware, the functionality of the nodes 103 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, files, and/or the flow charts of FIGS. 1-7 show the architecture, functionality, and operation of an implementation of the functionality of the nodes 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the functionality of each of the nodes 103 is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present invention, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method, comprising:
    storing a plurality of entries received from a plurality of external devices in a plurality of nodes;
    indicating the storage of the entries in the respective nodes using a logfile in each of the nodes, the nodes being arranged in a circular replication configuration;
    operating each of the nodes as a master of a downstream one of the nodes;
    operating each of the nodes as a slave to an upstream one of the nodes;
    replicating the entries received by a respective one of the nodes in the remaining ones of the nodes via circular replication by replicating the entries from each master to the slave of the master;
    determining in one of the nodes whether the master to the one of the nodes has failed;
    employing an alternate one of the nodes as a new master to the one of the nodes upon a failure of the master, thereby bypassing the master;
    periodically generating heartbeat messages in each of the nodes; and
    replicating the heartbeat messages generated by each of the nodes in the remaining ones of the nodes via the circular replication.

2. The method of claim 1, further comprising the step of determining a starting point in the logfile of the new master from which to initiate replication to the one of the nodes.

3. The method of claim 2, further comprising the step of determining the starting point of the logfile of the new master from the heartbeat messages stored in the one of the nodes.

4. The method of claim 1, wherein the generating of the heartbeat messages further comprises including a plurality of items in each heartbeat message, the items comprising:
    a first entry number associated with the logfile of the node of origin of the heartbeat message, the first entry number indicating a position in the logfile associated with a latest group of entries replicated from the master of the node of origin;
    a second entry number indicating a position in the logfile associated with the latest group of entries stored in the master of the node of origin; and
    a field that indicates a status of a communication link between the node of origin and the master of the node of origin.

5. A system, comprising:
    a plurality of nodes in a circular replication configuration, each of the nodes having a logfile indicating storage of a plurality of entries, each of the nodes receiving the entries from a plurality of external devices;
    wherein the entries received by a respective one of the nodes are replicated in the remaining ones of the nodes via circular replication;
    wherein each of the nodes is a master of an adjacent, downstream one of the nodes, and each of the nodes is a slave to an adjacent, upstream one of the nodes, wherein the entries from each master are replicated to the slave of the master; and
    wherein each of the nodes is configured to bypass a failed one of the nodes to maintain the circular replication.

6. The system of claim 5, wherein each of the nodes is configured to:
    determine whether the master to the node has failed; and
    establish an alternate one of the nodes as a new master to the node upon a failure of the master, thereby bypassing the master.

7. The system of claim 6, wherein each of the nodes is further configured to determine a starting point in the entries of the logfile of the new master from which to initiate replication to the node.

8. The system of claim 7, wherein each of the nodes is further configured to periodically generate a heartbeat message, each of the heartbeat messages being replicated in all of the nodes via the circular replication.

9. The system of claim 8, wherein each of the nodes is further configured to determine the starting point in the entries of the logfile of the new master from which to initiate replication to the node from the heartbeat messages stored in the node.

10. The system of claim 8, wherein each heartbeat message further comprises:
    a first entry number associated with the logfile of the node of origin of the heartbeat message, the first entry number indicating a position in the logfile associated with a latest group of entries replicated to the node of origin from the master of the node of origin;
    a second entry number indicating a position in the logfile of the master associated with the latest group of entries; and
    a field that indicates a status of a communication link between the node of origin and the master of the node of origin.

11. The system of claim 5, wherein:
    each of the nodes periodically generates a heartbeat message; and
    each of the heartbeat messages is replicated in all of the nodes via circular replication.

12. The system of claim 11, wherein each node is configured to detect when the master of the node experiences a failure from at least one heartbeat message stored in the node.

13. A system, comprising:
a plurality of nodes in a circular replication configuration, each of the nodes having a logfile indicating storage of a plurality of entries, each of the nodes receiving the entries from a plurality of external devices;
wherein the entries received by a respective one of the nodes are replicated in the remaining ones of the nodes via circular replication;
wherein each of the nodes is a master of an adjacent, downstream one of the nodes, and each of the nodes is a slave to an adjacent, upstream one of the nodes, wherein the entries from each master are replicated to the slave of the master;
wherein each of the nodes periodically generates a heartbeat message and each of the heartbeat messages is replicated in all of the nodes via circular replication; and
wherein each heartbeat message indicates the node of origin of the heartbeat message and the node that is master to the node of origin.

14. A system, comprising:
a plurality of nodes in a circular replication configuration, each of the nodes having a logfile indicating storage of a plurality of entries, each of the nodes receiving the entries from a plurality of external devices;
wherein the entries received by a respective one of the nodes are replicated in the remaining ones of the nodes via circular replication;
wherein each of the nodes is a master of an adjacent, downstream one of the nodes, and each of the nodes is a slave to an adjacent, upstream one of the nodes, wherein the entries from each master are replicated to the slave of the master;
wherein each of the nodes periodically generates a heartbeat message and each of the heartbeat messages is replicated in all of the nodes via circular replication; and
wherein each heartbeat message further comprises a field that indicates a status of a communication link between the node of origin of the heartbeat message and the master of the node of origin.

15. A system, comprising:
a plurality of nodes in a circular replication configuration, each of the nodes having a logfile indicating storage of a plurality of entries, each of the nodes receiving the entries from a plurality of external devices;
wherein the entries received by a respective one of the nodes are replicated in the remaining ones of the nodes via circular replication;
wherein each of the nodes is a master of an adjacent, downstream one of the nodes, and each of the nodes is a slave to an adjacent, upstream one of the nodes, wherein the entries from each master are replicated to the slave of the master;
wherein each of the nodes periodically generates a heartbeat message and each of the heartbeat messages is replicated in all of the nodes via circular replication; and
wherein each heartbeat message includes a first entry number associated with the logfile of the node of origin of the heartbeat message, the first entry number indicating a position in the logfile associated with a latest group of entries replicated from the master of the node of origin.

16. The system of claim 15, wherein each heartbeat message includes a second entry number indicating a position in the logfile of the master of the node of origin of the latest group of entries.

17. A method, comprising:
storing a plurality of entries received from a plurality of external devices in a plurality of nodes;
indicating storage of the entries in the respective nodes using a logfile in each of the nodes, the nodes being arranged in a circular replication configuration;
replicating the entries received by a respective one of the nodes in the remaining ones of the nodes via circular replication;
designating each of the nodes as a master of an adjacent, downstream one of the nodes;
designating each of the nodes as a slave to an adjacent, upstream one of the nodes;
determining in one of the nodes whether the master to the one of the nodes has failed; and
establish an alternate one of the nodes as a new master to the one of the nodes upon a failure of the master, thereby bypassing the master;
wherein the step of replicating the entries received by a respective one of the nodes in the remaining ones of the nodes via circular replication further comprises the step of replicating the entries from each master to the slave of the master.

18. The method of claim 17, further comprising the step of determining a starting point in the logfile of the new master from which to initiate replication to the one of the nodes.

19. The method of claim 18, further comprising the steps of:
periodically generating heartbeat messages in each of the nodes; and
replicating the heartbeat messages generated by each of the nodes in the remaining ones of the nodes via the circular replication.

20. The method of claim 19, further comprising the step of determining the starting point in the entries of the logfile of the new master from the heartbeat messages stored in the node.

21. The method of claim 19, wherein the generating of the heartbeat messages further comprises including a plurality of items in each heartbeat message, the items comprising:
a first entry number associated with the logfile of the node of origin of the heartbeat message, the first entry number indicating a position in the logfile associated with a latest group of entries replicated from the master of the node of origin;
a second entry number indicating a position in the logfile of the master of the node of origin associated with the latest group of entries; and
a field that indicates a status of a communication link between the node of origin and the master of the node of origin.

22. The method of claim 17, further comprising the steps of:
periodically generating heartbeat messages in each of the nodes; and
replicating the heartbeat messages generated by each of the nodes in the remaining ones of the nodes via the circular replication.

23. The method of claim 22, further comprising the step of detecting in one of the nodes when the master of the one of the nodes experiences a failure from at least one heartbeat message stored in the one of the nodes.

24. The method of claim 22, further comprising the step of indicating the node of origin of the heartbeat message and the master to the node of origin in each of the heartbeat messages.

25. The method of claim 22, further comprising the step of indicating, in each heartbeat message, a status of a communication link between the node of origin of the heartbeat message and the master of the node of origin.

26. The method of claim 22, further comprising the step of indicating, in each heartbeat message, a position in the logfile of the node of origin of the heartbeat message associated with a latest group of entries replicated from the master of the node of origin.

27. The method of claim 26, further comprising the step of indicating, in each heartbeat message, a position in the logfile of the master of the node of origin associated with the latest group of entries.

28. A system, comprising:
  a node configured to be employed in a circular replication configuration, wherein the node is configured to communicate with a master node and a slave node, the node being a slave to the master node and a master to the slave node;
  a logfile associated with the node, the logfile indicating a plurality of entries stored in the node;
  the node having a processor circuit with a processor and a memory, the node further comprising operating logic stored in the memory and executable by the processor, the operating logic comprising:
    logic that stores the entries received from a plurality of external devices in the node;
    logic that periodically sends a downstream update of entries to the slave node;
    logic that periodically receives an upstream update of entries from the master node;
    logic that incorporates the upstream update of entries into the node;
    logic to determine whether the master node has failed;
    logic to establish a new master node upon a failure of the master node; and
    logic that determines a starting point in the logfile of the new master node indicating a position from which to initiate replication to the node.

29. The system of claim 28, wherein the logic that incorporates the upstream update of entries into the node further comprises logic that determines whether one of the entries in the upstream update of entries already exists in the node.

30. The system of claim 29, further comprising logic that discards the one of the entries in the upstream update when the one of the entries already exists in the node.

31. The system of claim 28, wherein the node further includes a plurality of heartbeat messages generated by the node and by at least one other node in the circular replication configuration, where the starting point is determined from the heartbeat messages.

32. The system of claim 28, wherein the operating logic further comprises logic that generates a plurality of heartbeat messages over time, each of the heartbeat messages indicating that the node is operational, and each of the heartbeat messages being transmitted to the slave node.

33. The system of claim 32, wherein each heartbeat message further comprises:
  a first entry number associated with the logfile of the node, the first entry number indicating a position in the logfile associated a latest update of entries from the master node; and
  a second entry number indicating a position in the logfile of the master node associated with the latest group of entries.

34. The system of claim 32, wherein each heartbeat message further comprises a field that indicates a status of a communication link between the node and the master node.

35. A system, comprising:
  a node configured to be employed in a circular replication configuration, wherein the node is configured to communicate with a master node and a slave node, the node being a slave to the master node and a master to the slave node;
  a logfile associated with the node, the logfile indicating a plurality of entries stored in the node;
  means for storing the entries received from a plurality of external devices in the logfile;
  means for periodically sending a downstream update of entries from the logfile to the slave node;
  means for periodically receiving an upstream update of entries from the master node;
  means for incorporating the upstream update of entries into the node; and
  means for generating a plurality of heartbeat messages over time, each of the heartbeat messages indicating that the node is operational, and each of the heartbeat messages being transmitted to the slave node;
  wherein each heartbeat message further comprises:
    a first entry number associated with the logfile of the node, the first entry number indicating a position in the logfile associated with a latest update of entries from the master node; and
    a second entry number indicating with a position in the logfile of the master node associated with the latest group of entries.

36. The system of claim 35, wherein the means for incorporating the upstream update of entries into the node further comprises means for determining whether one of the entries in the upstream update of entries already exists in the node, and discarding the one of the entries in the upstream update when the one of the entries already exists in the node.

37. The system of claim 35, wherein the operating logic further comprises:
  means for determining whether the master node has failed; and
  means for establishing a new master node upon a failure of the master node.

38. The system of claim 35, wherein each heartbeat message further comprises a field that indicates a status of a communication link between the node and the master node.

39. A computer-readable medium with a program executable by a computer system, comprising:
  a logfile configured to store a plurality of entries associated with a node to be employed in a circular replication configuration, wherein the node is configured to communicate with a master node and a slave node, the node being a slave to the master node and a master to the slave node;
  code that stores at least some of the entries that are received from a plurality of external devices in the node;
  code that periodically sends a downstream update of entries from the logfile to the slave node;
  code that periodically receives an upstream update of entries from the master node;
  code that incorporates the upstream update of entries into the node;
  code that determines whether the master node has failed;
  code that establishes a new master node upon a failure of the master node; and code that determines a starting point in the logfile of the new master node from which to initiate replication to the node.

40. The computer-readable medium of claim 39, wherein the node further includes a plurality of heartbeat messages generated by the node and by at least one other node in the circular replication configuration, where the starting point is determined from the heartbeat messages.

41. The computer-readable medium of claim 39, further comprising:
- code that generates a plurality of heartbeat messages over time, each of the heartbeat messages indicating that the node is operational; and
- code that transmits each of the heartbeat messages to the slave node.

42. The computer-readable medium of claim 41, wherein each heartbeat message further comprises:
- a first entry number associated with the logfile of the node, the first entry number indicating a position in the logfile associated with a latest update of entries from the master node; and
- a second entry number indicating a position in the logfile of the master node associated with the latest group of entries.

43. The computer-readable medium of claim 41, wherein each heartbeat message further comprises a field that indicates a status of a communication link between the node and the master node.

* * * * *

UNITED STATES PATENT AND TRADEMARK OFFICE
CERTIFICATE OF CORRECTION

| | | |
|---|---|---|
| PATENT NO. | : 7,720,815 B1 | Page 1 of 1 |
| APPLICATION NO. | : 11/845379 | |
| DATED | : May 18, 2010 | |
| INVENTOR(S) | : Ramesh Jagannathan | |

It is certified that error appears in the above-identified patent and that said Letters Patent is hereby corrected as shown below:

Column 17, line 63 (claim 33): after the word "associated," insert --with--.

Signed and Sealed this

Twenty-ninth Day of June, 2010

David J. Kappos
*Director of the United States Patent and Trademark Office*